Figures 1, 2:
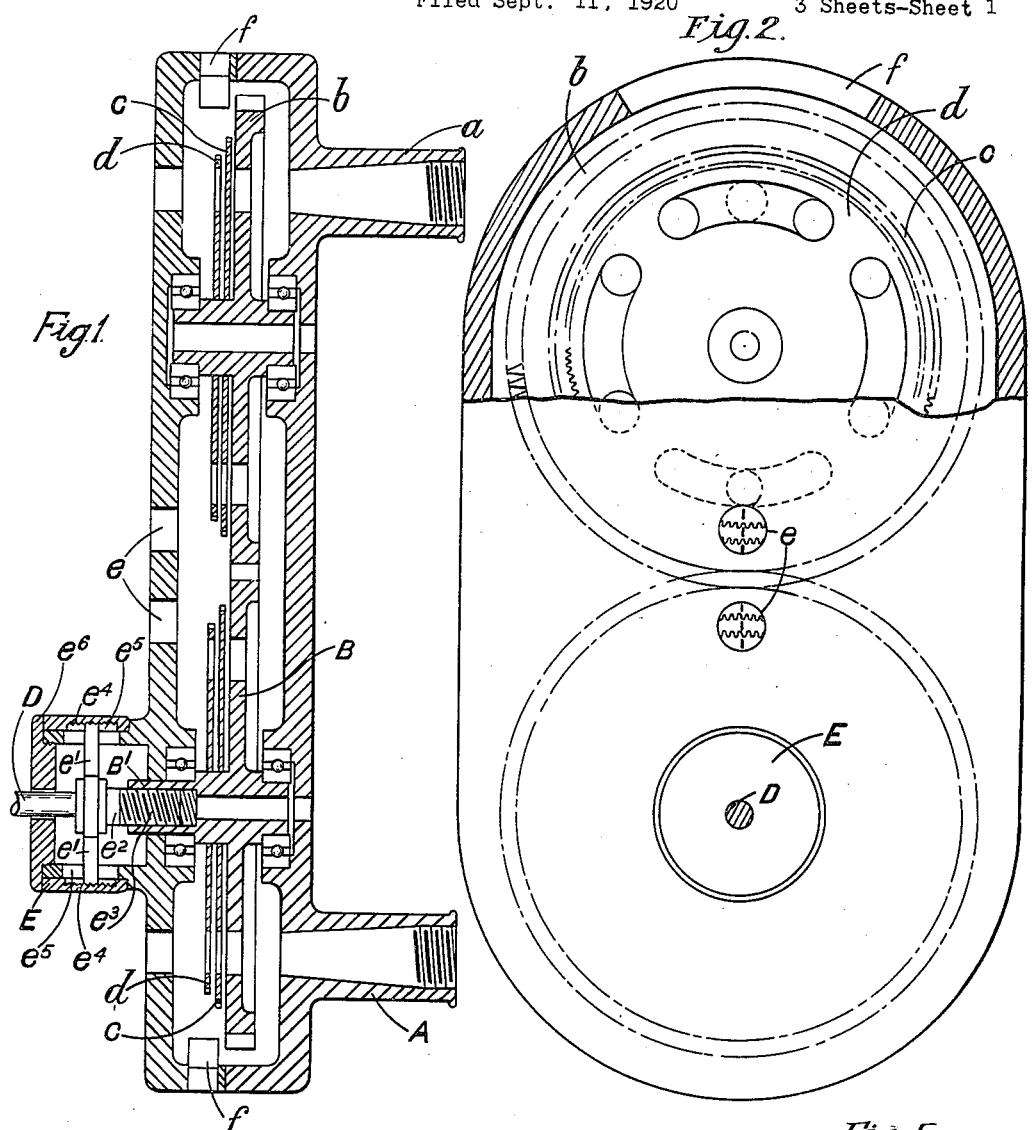

May 8, 1923.

A. J. H. ELVERSON

STROBOSCOPIC APPARATUS

Filed Sept. 11, 1920

1,454,713

3 Sheets-Sheet 2

INVENTOR
ARTHUR J.H. ELVERSON
BY
ATTORNEYS

May 8, 1923.

A. J. H. ELVERSON

STROBOSCOPIC APPARATUS

Filed Sept. 11, 1920

1,454,713

3 Sheets-Sheet 3

WITNESSES
W.A.Williams.

INVENTOR
Arthur J. H. Elverson

BY Munn & Co.

ATTORNEYS

Patented May 8, 1923.

1,454,713

UNITED STATES PATENT OFFICE.

ARTHUR JOHN HAWES ELVERSON, OF READING, ENGLAND, ASSIGNOR TO HERBERT KENNEDY & COMPANY LIMITED, OF LONDON, ENGLAND.

STROBOSCOPIC APPARATUS.

Application filed September 11, 1920. Serial No. 409,725.

*To all whom it may concern:*

Be it known that I, ARTHUR JOHN HAWES ELVERSON, a subject of the King of Great Britain, residing at Loddon Bridge, Reading, England, have invented certain new and useful Improvements in Stroboscopic Apparatus, of which the following is a specification.

The object of this invention is to provide an improved stroboscopic apparatus for use in studying the movement of bodies moving at relatively high speeds in a periodic manner.

A further object of the invention is to provide an apparatus in which the stroboscope is driven at a speed differing slightly from the speed of the moving body, (hereinafter referred to as the mechanism), so that the mechanism appears to traverse its path at a relatively slow speed. If, for instance, there is driven from the mechanism, such as an engine shaft, a wheel having 99 teeth, and this gears with a second wheel having 100 teeth, and from the latter a suitable flash illuminating device, such as a vacuum tube is driven, then the mechanism will appear to move at $\frac{1}{100}$ of its real speed, and its movement can be studied. This gearing I refer to as a "creeper-gear".

By providing alternative flash-controlling devices, one synchronizing with the mechanism and the other driven through the creeper-gear, the mechanism can be viewed either in apparently stationary position or apparently performing its periodic movement at reduced speed.

In order to be able to adjust the phase of the movement at which the mechanism is viewed in an apparently stationary position there is interposed, in the drive for the flashing mechanism, a phase adjuster. This may take the form of a worm-box capable of rotation to give the necessary differential movement the worm-box being provided with an indexing head by means of which the alteration in phase may be definitely controlled.

The invention may be applied to studying the amplitude, nature and period of vibrations by controlling the flashing apparatus so as to give flashes at intervals corresponding to given fractions of the time period of the movement of the mechanism which gives rise to the vibration.

In order to determine the amplitude and nature of the vibrations, the mechanism may be viewed through a telescope eye-piece provided with a graticule preferably ruled in the form of a double diagonal scale and with an adjustable hair line which is adjusted to coincide with the observation point on the mechanism the coordinates of which may then be read off by means of the graticule.

This observation is usually made while the stroboscope is driven synchronously with the mechanism, and the phase adjuster is employed in order to obtain successive readings of the co-ordinates from which the forms of the vibrations may be studied. In order to provide a suitable view point, the stroboscopic flashing apparatus may consist of a high tension spark transmitted at the point to be observed at periods synchronizing with the time period of the mechanism. A telephonic microphone may be employed in the apparatus in order to determine the phase point of an irregularity such as the knocking point in an internal combustion engine.

The stroboscopic apparatus may give the flash by means of vacuum tubes or by direct light viewed through an obscurator such as a disc provided with slots. In the latter case, a number of superposed disks may be employed, the slots in which are so designed that by relative rotation of the disks any given number of flashes per revolution of the mechanism may be obtained.

Further, by employing a cinematographic camera or similar device in conjunction with this apparatus, a photograph of successive positions of the mechanism may be obtained.

Figure 3:
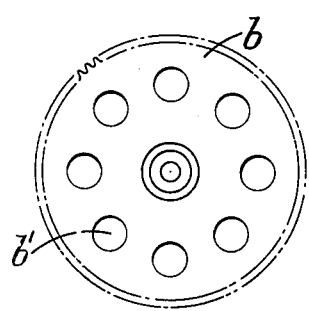
Figure 4:
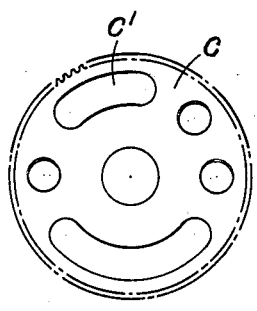
Figure 5:
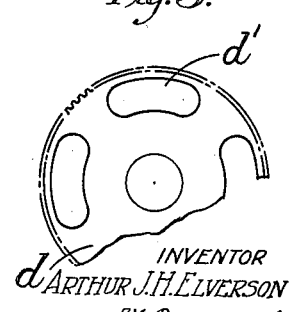
Figure 6:
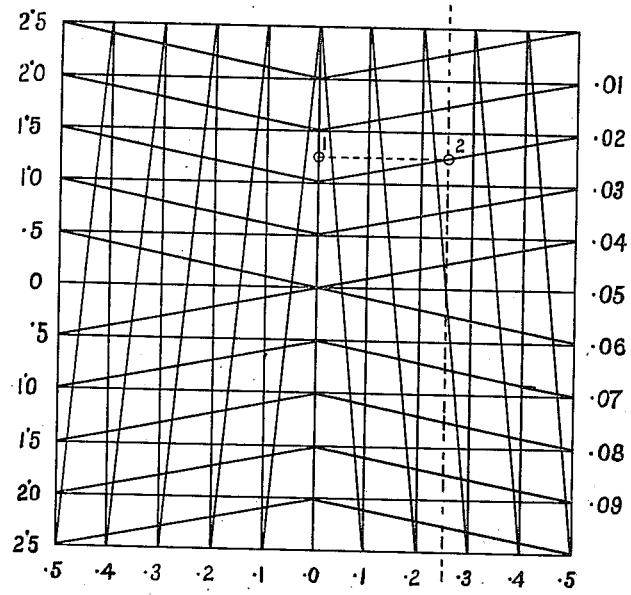
Figure 7:
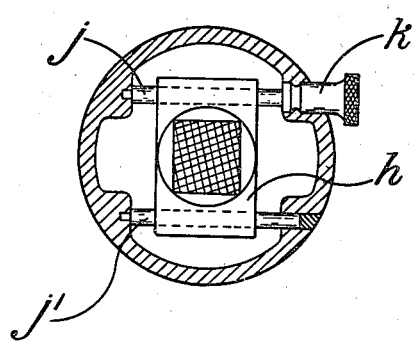
Figure 8:
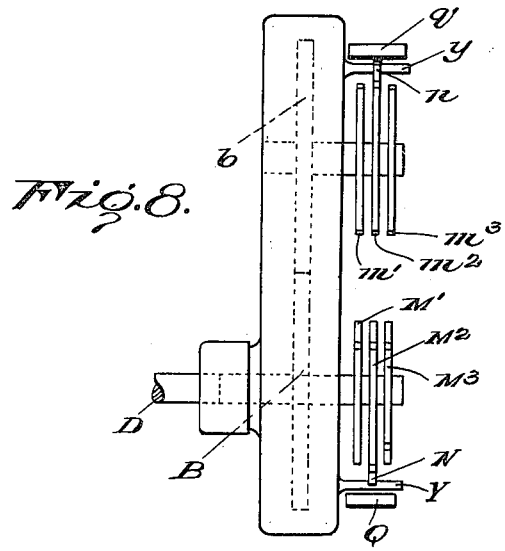
Figure 9:
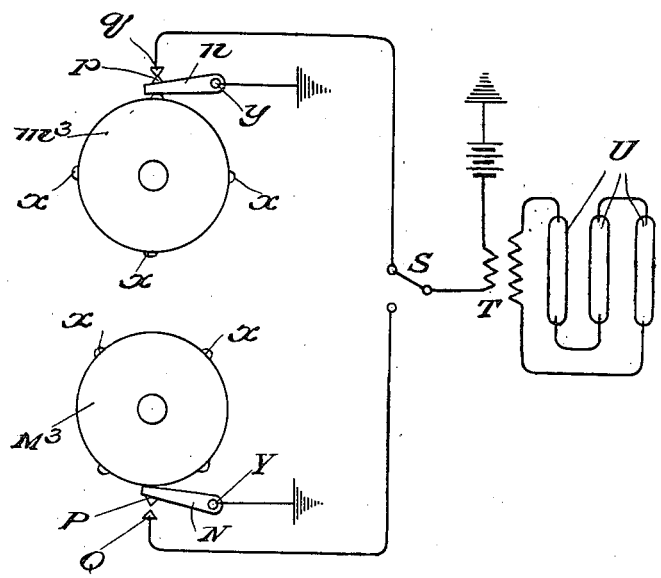

In the accompanying drawings which illustrate the invention, Fig. 1 shows in section an instrument constructed in accordance with the invention. Fig. 2 shows, in part section, a side view of the instrument viewed from the left in Fig. 1. Figs. 3 to 5 show smaller scale elevations of the driving wheels and obscurator disks for obtaining one, two, four or eight flashes per revolution of the driving wheels. Figs. 6 and 7 show the preferred form of graticule for observing the nature and amplitude of vibrations. Figure 8 shows in elevation an arrangement of electric contact devices for timing flashes, and Figure 9 shows a side elevation thereof in diagrammatic form showing electric circuits.

The instrument shown in Figures 1–5, is intended for direct vision and is provided with two view tubes A, $a$ which may be provided with telescopic eye-pieces: the former, A, views through apertures formed in a wheel B, driven at the speed frequency of the mechanism and the latter, $a$, views through a similarly apertured wheel $b$ driven at a speed frequency slightly behind that of the mechanism. The wheel B has preferably 99 teeth and the wheel $b$ 100 teeth: each wheel has eight apertures $b^1$ and has arranged behind it obscurator disks $c$, $d$ provided with orifices $c^1$, $d^1$ respectively as shown in Figs. 4 and 5.

By angular adjustment of these disks relatively to the wheels it is possible to obtain one, two, four or eight flashes per revolution of either wheel. Windows $e$ are provided in the case to facilitate the relative adjustment of the wheels and disks which are provided with numbers on their edges as shown and slots $f$ are provided at the top and bottom of the case to give access to the peripheries of the disks which are preferably toothed. In the position shown in Figs. 1 and 2 the disks are set to give one flash per revolution of the mechanism. If therefore the mechanism is viewed through the tube A it will appear to be stationary: but if through the tube $a$ the mechanism will appear to perform its cyclic movement at one hundredth of its true speed.

Cams may be fitted concentrically with the pinions B, $b$ to control electric contact devices for giving flashes by means of neon tubes or other known appliances employed in stroboscopic apparatus.

As shown in Figures 8 and 9, cams $m^1$, $m^2$, $m^3$, and $M^1$, $M^2$, and $M^3$ are mounted upon the shafts of the pinions $b$, B respectively; one of the cams in each set has one projection $x$, another has two projections equally spaced and the third has four projections equally spaced. Contact levers $n$, N are pivoted and axially movable upon shaft $y$, Y and carry contacts $p$, P adapted to engage contacts $q$, Q. The latter are connected up by an electric circuit including a two-pole switch S to a transformer or induction coil T in the secondary circuit of which neon tubes are arranged.

According to the axial setting of the levers $n$, N, which are spring-pressed against the wheels, contacts are made through the members $p$, $q$ and P, Q once, twice or four times per revolution of the shafts of the pinions $b$, B and one of these sets of contacts cause timed flashes to be communicated to the neon tubes U. In the normal use of the apparatus the levers are set to give one contact per revolution of the pinions and thus according to the setting of the switch the mechanism will then be illuminated so as either to appear stationary or to appear to perform its periodic movement at reduced speed.

The wheels B, $b$ are preferably provided with roller bearings as shown and the wheel B is driven from the drive shaft D through the phase adjuster E.

The phase adjuster comprises in its preferred form two arms $e^1$ encircling a circular groove in a sleeve $e^2$ splined to the driving shaft D. The forward portion of this sleeve is provided with a quick-pitch male thread $e^3$ which engages a female thread cut in a boss $B^1$ projecting from the wheel B. The arms $e^1$ project through slots $e^5$ in the case and are toothed to engage an internal screw thread cut in a ring $e^4$ which is held in position by a cap $e^6$ but is capable of rotation. This ring can be rotated in either direction to adjust the phase of the flashes in the following manner while the driving shaft is running: the arms are prevented by the slots $e^5$ from rotation and are forced by the screw threads on rotational movement of the ring, to move longitudinally parallel to the axis of the driving shaft. This longitudinal movement is transmitted to the sleeve $e^2$, the quick-pitch screw on which causes the boss $B^1$ to move relatively to the shaft D and thus varies the phase relation between the flashes of the stroboscope and the movement of the mechanism.

Arms $e^1$ are incapable of rotation by virtue of the fact that the slots $e^5$ in their radial dimensions provide only working clearance for arms $e^1$. A tendency for the rotation of arms $e^1$ with sleeve $e^2$ is prevented by making arms $e^1$ a running fit on sleeve $e^2$.

In order to study the amplitude and period of vibrations the graticule illustrated in Figs. 6 and 7 is employed in conjunction with a movable hair line in the eye-piece connected to one of the tubes A, $a$.

In order to determine the height of the synchronized spark above a given datum line to which the eye-piece is set, the spark is viewed in the centre line in the position marked 1 in Fig. 6, which indicates the numerical graticule markings. The graticule is mounted in a plate $h$ on rods $j$ $j^1$ the former of which has screwed connection with the plate and is provided with an adjustment head $k$: by turning this head $k$ the graticule is moved until the spark intersects a horizontal diagonal at the position marked 2. The intersection of the hair line indicated in dotted lines (which may be adjustable) with the vertical diagonal is then noted. In the position shown the reading is $1.0+.2+.05=1.25$.

The knowledge of the phase angle enables a diagram to be plotted of the nature of the vertical vibration: and by rotating the graticule and hair line through ninety degrees the horizontal amplitude can be measured.

I claim:—

1. In a stroboscopic apparatus for studying the movement of a body having a shaft rotating at a relatively high speed and capable of rotating at different speeds, the combination of a rotating member driven from said shaft, flash-timing means operated by said rotating member and selective means whereby said flash-timing means may be actuated to produce each of a plurality of different whole numbers of flashes per revolution of said member.

2. In a stroboscopic apparatus for studying the movement of a body moving at relatively high speeds in a periodic manner, the combination of flash-timing means, driving means for driving said flash-timing means synchronously with the body, a second flash-timing means, a second driving means for driving said second flash-timing means at a frequency differing by a small fractional amount from the frequency of the body, both said driving means being simultaneously in operative connection with their flash-timing means.

3. In a stroboscopic apparatus for studying the movement of a body moving at relatively high speeds in a periodic manner, the combination of flash-timing means, driving means for driving said flash-timing means synchronously with the body, a second flash-timing means, a second driving means for driving said second flash-timing means at a frequency differing by not more than three per cent from the frequency of the body, both said driving means being simultaneously in operative connection with their flash-timing means.

4. In a stroboscopic apparatus for studying the movement of a body moving at relatively high speeds in a period manner, the combination of a first gear wheel driven synchronously with said shaft, a second gear wheel driven from said first gear wheel at an angular speed differing slightly from that of the first gear wheel, and two simultaneously-driven flash-timing means one driven synchronously with said first gear wheel and the other driven synchronously with said second gear wheel.

5. In a stroboscopic apparatus for studying the movement of a body moving at relatively high speeds in a periodic manner, the combination of flash-timing means, driving means for driving said flash-timing means synchronously with the body, a second flash-timing means, a second driving means for driving said second flash-timing means at a frequency differing by a small fractional amount from the frequency of the body, and selective means for causing one or other of said flash-timing means to give timed flashes to illuminate the body to be studied.

6. In a stroboscopic apparatus for studying the movement of a body moving at relatively high speeds in a periodic manner, the combination of sighting means, flashing means therefor, means for driving the flashing means from the body to be studied at a frequency differing by a small fractional amount from the frequency of the body, a second sighting means, and flashing means therefor driven synchronously with the body.

7. In a stroboscopic apparatus for studying the movement of a body moving at relatively high speed in a periodic manner, the combination of sighting means, a flashing wheel with axis parallel to the sighting means and provided with evenly-spaced apertures adapted periodically to allow vision through said sighting means, means for driving said flashing wheel synchronously with the body and means for obscuring some of the apertures in said wheel.

8. In a stroboscopic apparatus for studying the movement of a body moving at relatively high speeds in a periodic manner, the combination of sighting means, a flashing wheel with axis parallel to the sighting means and provided with eight evenly-spaced apertures adapted periodically to allow vision through said sighting means two discs concentric with said wheel, said discs being provided with apertures and being capable of adjustment and means for relative adjustment of said discs alternatively to cause to be masked seven, six, four or none of said apertures in said wheel.

9. In a stroboscopic apparatus for studying the movement of a body moving at relatively high speeds in a periodic manner, the combination of sighting means, a flashing wheel with axis parallel to the sighting means and having evenly-spaced apertures adapted periodically to allow vision through said sighting means, means for driving said wheel synchronously with the body to be studied, teeth on said wheel, a second sighting means, a second flashing wheel with axis parallel to said sighting means, and having evenly-spaced apertures in said second flashing wheel adapted periodically to allow vision through said second flashing wheel, and teeth on the latter wheel engaging the teeth on the first wheel and differing in number by a small amount from those on the first wheel.

10. In a stroboscopic apparatus for studying the movement of a body having a shaft rotating at relatively high speed the combination of sighting means, flashing means therefor, mechanical driving means for driving said flashing means synchronously with said shaft and means interposed between said shaft and said flashing means for causing flashes to occur at different angular positions of said shaft without stopping said driving means.

11. In a stroboscopic apparatus for studying the movement of a body moving at relatively high speeds in a periodic manner, the combination of an eyepiece, a flashing device therefor, means for driving the flashing device synchronously with the body to be studied, and means for measuring the displacement of a given point on the body from the axis of the eyepiece, comprising a transparent double diagonal scale arranged in the eyepiece and means for adjusting the scale relatively to the axis of the eyepiece.

12. In a stroboscopic apparatus for studying the movement of a body having a shaft rotating at relatively high speed the combination of sighting means, flashing means therefor, a first gear wheel driven synchronously with said shaft, a second gear wheel driven from said shaft at an angular speed differing slightly from that of the first gear wheel and selective means for causing flashes to occur once, twice or other exact number of times for each revolution of said second gear wheel.

13. In a stroboscopic apparatus for studying the movement of a body having a shaft rotating at a relatively high speed and capable of rotating at different speeds, the combination of a rotating member driven from said shaft, flash-timing means operated by said rotating member, and means for varying the number of flashes per revolution of said member.

14. In a stroboscopic apparatus for studying the movement of a body having a shaft rotating at a relatively high speed and capable of rotating at different speeds, the combination of a rotating member driven from said shaft, flash-timing means operated by said rotating member, and means for varying the number of flashes in a given period of time but independently of the speed of revolution of said member.

In testimony whereof I affix my signature.
ARTHUR JOHN HAWES ELVERSON.